A. C. PATTISON.
COMBINED TOASTER AND BOILER SUPPORT.
APPLICATION FILED JULY 30, 1917.
1,349,529.
Patented Aug. 10, 1920.
2 SHEETS—SHEET 1.
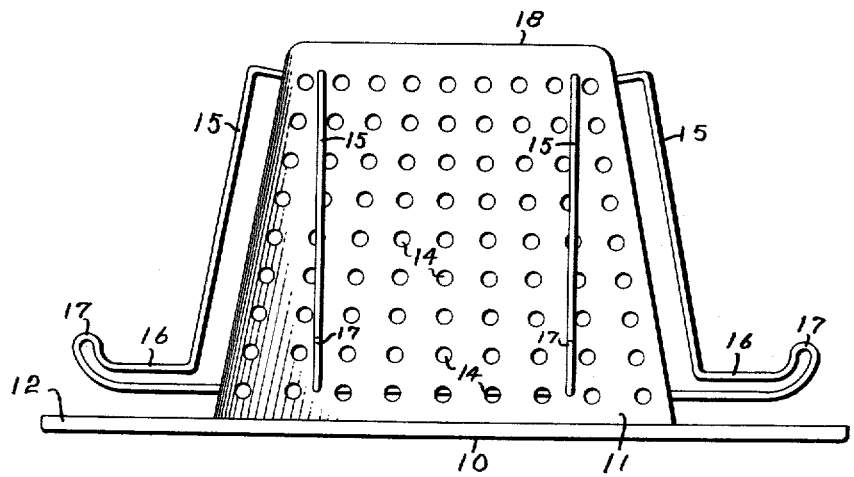
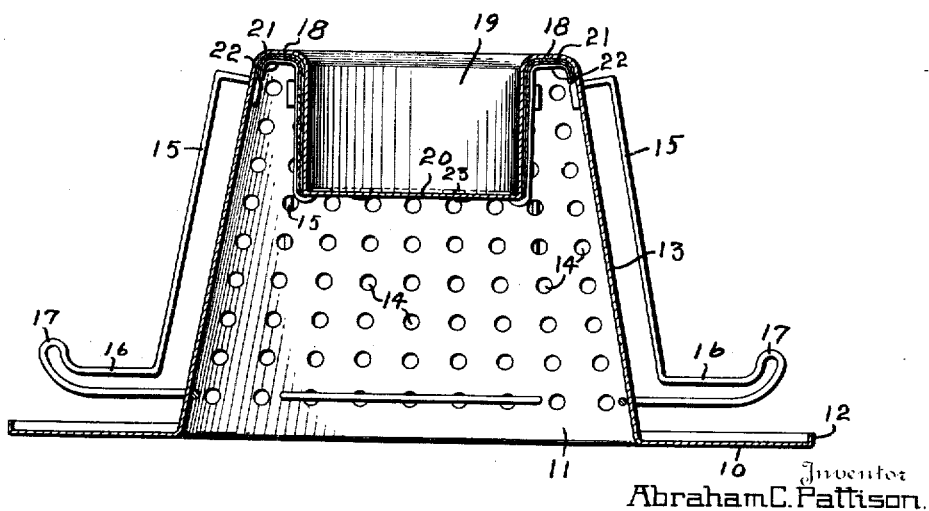
Inventor
Abraham C. Pattison.

A. C. PATTISON.
COMBINED TOASTER AND BOILER SUPPORT.
APPLICATION FILED JULY 30, 1917.
1,349,529.
Patented Aug. 10, 1920.
2 SHEETS—SHEET 2.
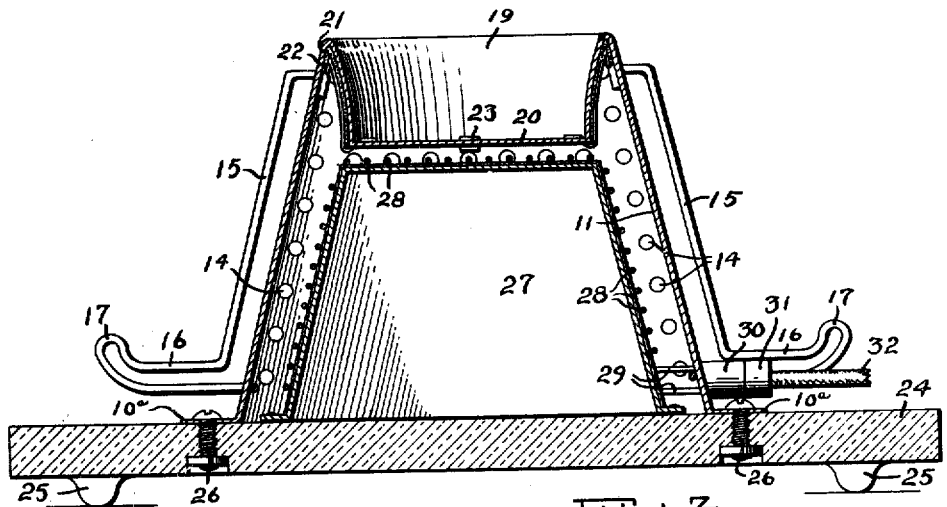
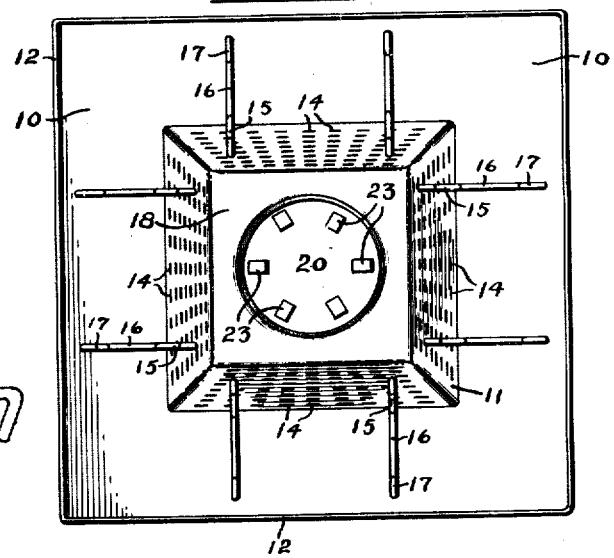
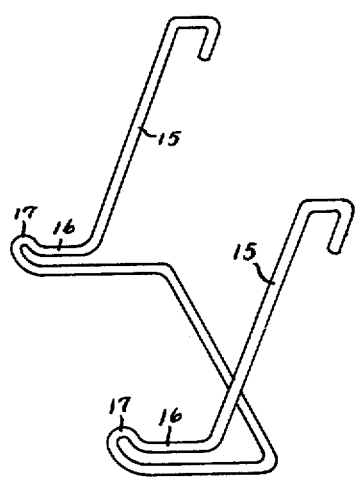
Inventor
Abraham C. Pattison
By Lancaster and Allwine
Attorneys

UNITED STATES PATENT OFFICE.

ABRAHAM C. PATTISON, OF CUMBERLAND, WISCONSIN.

COMBINED TOASTER AND BOILER-SUPPORT.

1,349,529.

Specification of Letters Patent.  Patented Aug. 10, 1920.

Application filed July 30, 1917. Serial No. 183,585.

*To all whom it may concern:*

Be it known that I, ABRAHAM C. PATTISON, a citizen of the United States, and a resident of Cumberland, in the county of Barron and State of Wisconsin, have invented a certain new and useful Improvement in Combined Toasters and Boiler-Supports, of which the following is a specification.

The present invention relates to domestic cooking utensils, and more particularly to a device in the nature of a bread toaster.

An object of the present invention is to provide a device of this character which may be used simultaneously as a toaster for bread, or the like, and a support for a utensil, such as a boiler for making coffee, cooking cereals and like uses; a device which occupies but relatively small space upon the top of a stove; a device which may be placed over one burner or stove opening; a device which may be constructed from sheet metal and wire; and a device which is so constructed as to firmly support a boiler or other utensil and prevent the turning over of the latter.

The above, and various other objects and advantages of this invention will be in part described, and in part understood, from the following detailed description of the present preferred embodiment, the same being illustrated in the accompanying drawings wherein:

Figure 1 is a side elevation of a combined toaster and boiler holder constructed according to the present invention.

Fig. 2 is a vertical section taken through the same.

Fig. 3 is a top plan view of the device.

Fig. 4 is a detail perspective view of one of the toast racks.

Fig. 5 is a vertical section through a slightly modified form of the device adapted to be heated by electricity.

Referring to these drawings, 10 designates a flat sheet metal base of preferably rectangular form having a relatively large central opening 11 therethrough and provided at its outer marginal edge with an upturned bracing flange 12. The body part of the device comprises side walls 13 which extend upwardly from the inner marginal edge of the opening 11 and which converge slightly toward their upper ends. The side walls 13 may, be, as shown, integrally formed with the base plate 10, or may be of any other suitable construction. The side walls 13 are formed with pluralities of perforations 14 therethrough adapted to admit the passage of heat from the interior of the body through the sides thereof.

The sides 13 are preferably flat, and each side is provided with a toast rack preferably of the form shown in detail in Fig. 4. The toast rack shown in Fig. 4 comprises a single length of wire which is bent, generally, into U-shape to provide the opposite arm portions 15 bent at substantially right angles at their upper ends and adapted for passage at their upper extremities through the upper portion of the adjacent side 13. The free extremities of the arms 15 are turned over against the inner face of the side 13 to retain the arms 15 thereto. The arms 15 extend downwardly at the outer side of the body portion and are spaced therefrom throughout the lengths of the arms 15. The lower ends of the arms 15 are bent outward abruptly to form rests 16 upon which the lower edges of the slices of bread or the like to be toasted may be placed. The length of wire is returned beneath the rest 16 and passes through the lower portions of the adjacent side 13, the closed end of the wire being secured across the inner face of the side 13 at its lower portion. The outer ends of the rests 16 are slightly upturned to provide stops 17 to prevent the displacement of the slices of bread or the like.

The top 18 of the body part is substantially of ring form, and is preferably flat. From the inner marginal edge of the ring 18 depends a supporting or retaining receptacle 19, and the ring and the receptacle may be integrally formed with the sides 13. The receptacle 19 is provided with a bottom 20 upon which is adapted to rest the lower end of a utensil, such as a boiler, a coffee pot or the like. The receptacle 19 is of a depth slightly less than one-half the height of the body 13, although it is of course understood that the receptacle 19 may be of any desired practical depth.

The receptacle 19 is preferably provided, exteriorly thereof, with a layer of asbestos 21, or the like, which is held in place against the exterior surface of the receptacle 19, and against the lower side of the ring or top 18, by a plurality of preferably sheet metal straps 22. The straps 22 are arranged vertically against the outer side of the layer of asbestos 21, and the lower ends of the straps 22 are overturned against the bottom 20 of the receptacle and are preferably extended upwardly therethrough and flattened against the upper face of the bottom 20. These lower extremities of the straps 22 which are flattened against the upper face of the bottom 20 form rests 23 upon which the boiler or other receptacle may be supported. The upper ends of the straps 22 follow the contour of the asbestos layer 21 and are overturned in substantially U-shape to hold the asbestos against the receptacle and the ring 18. The heat insulating lining 21 may of course be formed of any other suitable material than asbestos, and is so positioned for the purpose of deflecting the heat outwardly through the sides 13 of the body and preventing the undue heating of the handle, the spout and other projections which may be placed upon the boiler employed.

In the modification disclosed in Fig. 5, the device is disclosed as adapted for use in cooking with electricity. In this instance, the body portion is mounted upon a base board 24 of porcelain or other suitable substance which is heat nonconducting and which may be provided with feet 25 or the like to space the base board 24 above a table or other surface on which the utensil may be supported. In this instance, the base plate 10ª of the body portion is relatively short and is secured to the base board 24 by screws 26 or the like which may pass through the board. A preferably hollow sheet metal support 27 is mounted upon the base board 24 within the body portion of the toaster, and preferably conforms in general contour with the shape of the same. This support 27 is reduced in size as compared with the width and height of the body portion of the device and is provided exteriorly with a heating coil 28 which extends around the sides of the support and also across the top of the same. The wires 29 from the heating coil 28 may be carried laterally from the support 27 and through the adjacent side 13 of the body portion to a socket 30 secured thereto, which is adapted to receive the usual connecting plug 31 carried upon the end of an electric cord 32 of the usual type. In other respects the construction of the device is similar to that disclosed in the other figures of the drawings.

The use of the device is apparent, for the base 10 is made of a size adapted to fit over a single burner or opening of a stove with the opening 11 of the base directly over the flame. The heat from the burner passes upwardly into the body portion of the device and radiates through the openings 14 thereof for toasting the slices of bread or the like which may be placed upon the rack. If a boiler or pot is placed in the receptacle 19, the boiler or the like is supported by the sides of the receptacles 19 from tilting or being overturned, and the heat passing upwardly through the body of the device quickly heats the bottom 20 and the boiler or pot placed in the receptacle. The spout and handle of a pot, or the handle of a suitable saucepan or the like is prevented from becoming overheated by the provision of the heat insulating material 21 which surrounds the receptacle 19 and is arranged beneath the ring 18.

It is of course understood that various changes and modifications may be made in the details of construction and design of the various parts of the above specifically described embodiment of the invention without departing from the spirit thereof, such changes and modifications being restricted only by the scope of the following claims.

I claim:

1. In a combined toaster and boiler, the combination of a hollow body having perforations in its sides, toast racks arranged exteriorly of the body, and a receptacle within the body and projecting a short distance below the top of the body to form a relatively shallow receptacle adapted to be heated by the heated air within the body and to deflect the heated air in the upper end of the body through said perforations to the toast racks.

2. In a combined toaster and boiler support, the combination of a hollow body portion having perforations in the side thereof, a boiler support carried within the upper end of the body portion, toasting racks arranged about the body portion, and heat insulating means arranged within the upper end of the body portion about said boiler support for deflecting heat from the sides of the support through the perforations in the body portion.

3. In a combined toaster and boiler support, the combination of a hollow body, a receptacle countersunk in the upper portion of the body and adapted to receive a boiler therein, toasting racks arranged about the body portion, and heat insulating means arranged about the receptacle and in the upper end of the body portion adapted to deflect heat outwardly through the sides of the body portion and to prevent overheating of the upper portion of the boiler.

4. In a combined toaster and boiler, the combination of a hollow body having perforations in its side walls, racks arranged exteriorly about the body to hold material to be toasted, and a receptacle suspended through the top of the body whereby the receptacle may be heated and deflect heat through the perforations to the material on the racks.

5. In a combined toaster and boiler, the combination of a base plate having a relatively large central opening, a body part mounted on the base plate, and extending upwardly thereform and provided with perforations, in its sides, racks supported exteriorly upon the body, and a receptacle suspended in said body and projecting downwardly.

6. In a combined toaster and boiler, the combination of an upwardly tapering body portion having perforations in its sides, pairs of bars arranged against the outer sides of the body and provided with upwardly and outwardly turned hooks at their lower ends, spacing and supporting means between the bars and engaging the body to hold the bars in spaced relation and upon the body, the upper ends of the bars being turned inwardly and secured to the upper part of the body and a receptacle suspended in the top of the body.

7. In a device of the character described, the combination of an upwardly tapering perforated body, toast racks on the exterior of the body adapted to hold bread to be toasted by the heat issuing through the perforations in said tapering body, a relatively large receptacle suspended in the top of the body for receiving material to be heated and having its bottom arranged to deflect heat laterally through the perforations to the bread.

ABRAHAM C. PATTISON.